United States Patent
Charipar

(10) Patent No.: US 9,386,753 B1
(45) Date of Patent: Jul. 12, 2016

(54) CENTER PIVOT IRRIGATION SYSTEM

(71) Applicant: Marvin Charipar, Columbus, NE (US)

(72) Inventor: Marvin Charipar, Columbus, NE (US)

( * ) Notice: Subject to any disclaimer, the term of this patent is extended or adjusted under 35 U.S.C. 154(b) by 325 days.

(21) Appl. No.: 14/155,425

(22) Filed: Jan. 15, 2014

(51) Int. Cl.
   *B05B 3/00* (2006.01)
   *A01G 25/09* (2006.01)

(52) U.S. Cl.
   CPC .................... *A01G 25/092* (2013.01)

(58) Field of Classification Search
   CPC .................................................. A01G 25/092
   USPC .................................................. 239/728–733
   See application file for complete search history.

(56) References Cited

U.S. PATENT DOCUMENTS

| | | | |
|---|---|---|---|
| 3,730,435 A | | 5/1973 | Zimmerer et al. |
| 4,011,990 A | * | 3/1977 | Meis ............... A01G 25/092 239/11 |
| 4,432,494 A | * | 2/1984 | Hunter ............. A01G 25/092 239/729 |
| 4,674,681 A | * | 6/1987 | Meis ............... A01G 25/097 239/1 |
| 5,341,995 A | | 8/1994 | Leatch |
| 5,695,129 A | * | 12/1997 | Korus .............. A01G 25/092 239/729 |
| 6,726,132 B2 | * | 4/2004 | Malsam ........... A01G 25/092 239/69 |
| 8,369,996 B2 | * | 2/2013 | Choat .............. A01G 25/16 137/78.2 |
| 2013/0026259 A1 | * | 1/2013 | Korus .............. A01G 25/092 239/729 |

* cited by examiner

*Primary Examiner* — Jason Boeckmann
(74) *Attorney, Agent, or Firm* — Dennis L. Thomte; Thomte Patent Law Office LLC

(57) ABSTRACT

The method of irrigating a circular area with a reversible center pivot irrigation system wherein an obstruction is in the path of the outer end of the center pivot irrigation system is disclosed. In one embodiment, the last drive unit and the pipe span supported thereon may be moved to a trailing position with respect to the next to last drive unit to avoid the obstruction. In another embodiment, the last drive unit and the next to last drive unit and the pipe spans supported thereon may be moved to a trailing position with respect to the second to last drive unit to avoid the obstruction.

7 Claims, 17 Drawing Sheets

CENTER PIVOT IRRIGATION SYSTEM

BACKGROUND OF THE INVENTION

1. Field of the Invention

This invention relates to a center pivot irrigation system and more particularly to a center pivot irrigation system whereby the pipe span supported by the last drive unit may be selectively pivoted from its normal aligned relationship with respect to the remainder of the water pipeline to a tucked, trailing or towed position to enable the outer end of the center pivot irrigation system to avoid or by-pass an obstruction, such as trees or a farmstead, which may be in the path of the outer end of the center pivot irrigation system. This invention also relates to an embodiment of the center pivot irrigation system whereby the pipe spans supported by the last drive unit and the next to last drive unit may be selectively pivoted from their normal aligned relationship with respect to the remainder of the water pipeline to a tucked, trailing or towed position to enable the outer end of the center pivot irrigation system to avoid or by-pass the obstruction. Further, the invention relates to an embodiment wherein the pipe spans supported by obstructed intermediate drive units, in addition to the last drive unit and the next to last drive unit, may be selectively pivoted from their normal aligned relationship to a tucked, trailing or towed position to avoid or by-pass the obstruction. The method of operating the systems is also described.

2. Description of the Related Art

Center pivot irrigation systems or machines have been used for many years to irrigate circular areas of a field or the like. In most situations, the circle over which the center pivot irrigation system moves is free from any obstruction such as trees, farmsteads, etc. which protrude into the outer end of the circular arc or path of the center pivot irrigation system which prevents the center pivot irrigation system from making a complete circle. In the past, when such an obstruction was present, the center pivot irrigation system was operated until the outer end of the system came to a position adjacent one side of the obstruction, at which time the drive system and the sprinklers on the system were turned off. The center pivot system was then reversed until the system approached the other side of the obstruction. Such a method has at least two major disadvantages. If the system is reversed, the system must travel over ground which was just previously irrigated which may cause traction problems for the drive wheels of the drive units of the system. Perhaps the main disadvantage of the above-described method is that the center pivot irrigation system moves very slowly so that it may take one or more days before the system will reach the other side of the obstruction which may cause the crop at the other side of the obstruction to suffer from lack of irrigating water. When a lateral move irrigation system encounters one side of an obstruction, it cannot irrigate the area on the other side of the obstruction which dramatically affects the irrigation capability of the system.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In a first embodiment of the center pivot irrigation system of this invention, a plurality of pipe spans are formed together to form an elongated water pipeline which extends outwardly from a center pivot structure. Each of the pipe spans are supported upon an associated drive unit to propel the water pipeline over the area to be irrigated. Each of the drive units include an elongated, horizontally disposed main beam, having first and second ends, which is disposed transversely to the longitudinal axis of the water pipeline. A first wheel assembly is secured to the first end of the main beam and a second wheel assembly is secured to second end of the main beam of each of the drive towers. A reversible drive motor is operatively secured to the main beam of each of the drive units with the reversible drive motors being coupled to the associated first and second wheel assemblies of the drive unit.

The drive units include an inner drive unit, a last drive unit, a next to last drive unit, a second to last drive unit, and at least one intermediate drive unit between the second to last drive unit and the inner drive unit. A flexible joint is provided between adjacent spans.

The rotational axis of the first and second wheel assemblies on the inner drive unit, the intermediate drive units and the second to last drive unit are non-movably fixed to the associated main beam so as to be parallel to the longitudinal axis of the water pipeline. However, if the entire center pivot irrigation system is of the towable type, the rotational axis of the first and second wheel assemblies on the inner drive unit, the intermediate drive units and the second to last drive unit will be parallel to the longitudinal axis of the water pipeline during normal irrigation movement but may be selectively pivoted 90 degrees for towing purposes. The rotational axis of the first and second wheel assemblies of the last drive unit and the next to last drive unit are normally fixed to the associated main beam in a first position so as to be parallel to the longitudinal axis of the water pipeline whereby the pipe spans supported by the last drive unit and the next to last drive unit will be generally aligned with the pipe spans supported by the second to last drive unit, the intermediate drive units and the inner drive unit as the water pipeline is moved over the area being irrigated and to also permit the last drive unit and the next to last drive unit to be moved, when the second to last drive unit, the intermediate drive towers and the inner drive unit are stationary, to a trailing position wherein the pipe spans supported by the last drive unit and the next to last drive unit are disposed at approximately a right angle with respect to the pipe spans supported by the second to last drive unit, the intermediate drive units and the inner drive unit.

The first and second wheel assemblies of the last drive unit and the next to last drive units are configured to be pivoted to a second position with respect to the associated main beams so that the rotational axes of the first and second wheel assemblies of the last drive unit and the next to last drive unit will be parallel to the longitudinal axis of the associated main beam to enable the second to last drive unit, the intermediate drive units and the inner drive unit to pull the next to last drive unit and the last drive unit and the pipe spans supported thereon through the area in the trailing position.

In a second embodiment of the center pivot irrigation systems of this invention, only the last drive unit and the pipe span supported thereby is placed in the trailing position so that only the last drive unit and the pipe span supported thereon will be pulled by the other drive units.

Although the first embodiment permits the last drive unit and the next to last drive unit to be positioned in a trailing position to bypass an obstruction and the second embodiment permits the last drive unit, the next to last drive unit and the second to last drive unit to be positioned in a trailing position, additional intermediate drive units inwardly of the second to last drive unit could also be positioned in a trailing position.

The method of operating the first embodiment of the center pivot irrigation system, comprises the steps of: operating all of the drive units of the system to propel the water pipeline thereof around the center pivot support structure with the water pipeline being in a generally aligned position while irrigating the area therebelow until the outer end of the water pipeline is positioned near the first side of the obstruction; stopping all the drive motors on the drive units and the irrigation of the area; disconnecting the alignment mechanism on the second to last drive unit; closing the water pipeline at the second to last drive unit by means of a plug or valve; operating the drive motor on the next to last drive unit and the next to last drive unit in a reverse direction so that the portion of the water pipeline which is outwardly of the second to last drive unit of the system is approximately disposed at a right angle with respect to the water pipeline which is positioned inwardly of the second to last drive unit; pivoting the drive wheels on the second to last drive unit and the next to last drive unit from the irrigating position to a towed position; operating, while irrigating, all the drive motors on the drive units except for the drive motors on the next to last drive unit and the last drive unit in a forward direction until the water pipeline and the next to last drive unit and the last drive unit are positioned past the second side of the obstruction; stopping the drive motors on the drive units which were previously actuated; pivoting the drive wheels on the last drive unit and the next to the last drive unit from the towed position to the irrigating position; connecting the alignment system on the second to last drive unit; opening the water pipeline on the second to last drive unit; operating the drive motors on the last drive unit and the next to last drive unit in a forwardly direction until the pipe spans supported by the last drive unit and the next to last drive unit are parallel to the pipe spans supported by the second to last drive unit, the intermediate drive units and the inner drive unit; operating the reversible drive motors on all the drive units in a reverse manner until the outer end of the pipeline is positioned near the second side of the obstruction; and operating all the drive motors of the drive units in a forwardly direction to apply irrigating water to the area.

In the second embodiment of the center pivot irrigation systems of this invention, the last drive unit, the next to last drive unit and the second to last drive unit are pivotally moved with respect to the other drive units on the system.

In a third embodiment, the pipe spans supported by obstructed intermediate drive units, in addition to the last drive unit and the next to last drive unit, may be selectively pivoted from their normal aligned relationship to a trailing position to avoid or by-pass the obstruction.

It is therefore a principal object of the invention to provide an improved center pivot irrigation system.

A further object of the invention is to provide an improved center pivot irrigation system wherein the outer end of the system may be placed in a tucked, trailing or towed position to enable the outer end of the center pivot irrigation system to avoid or bypass an obstruction.

A further object of the invention is to provide a center pivot irrigation system of the type described which represents an enormous improvement over the prior art center pivot irrigation systems.

Yet another object of the invention is to provide a mechanized irrigation system which represents an improvement over the prior art mechanized irrigation systems.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
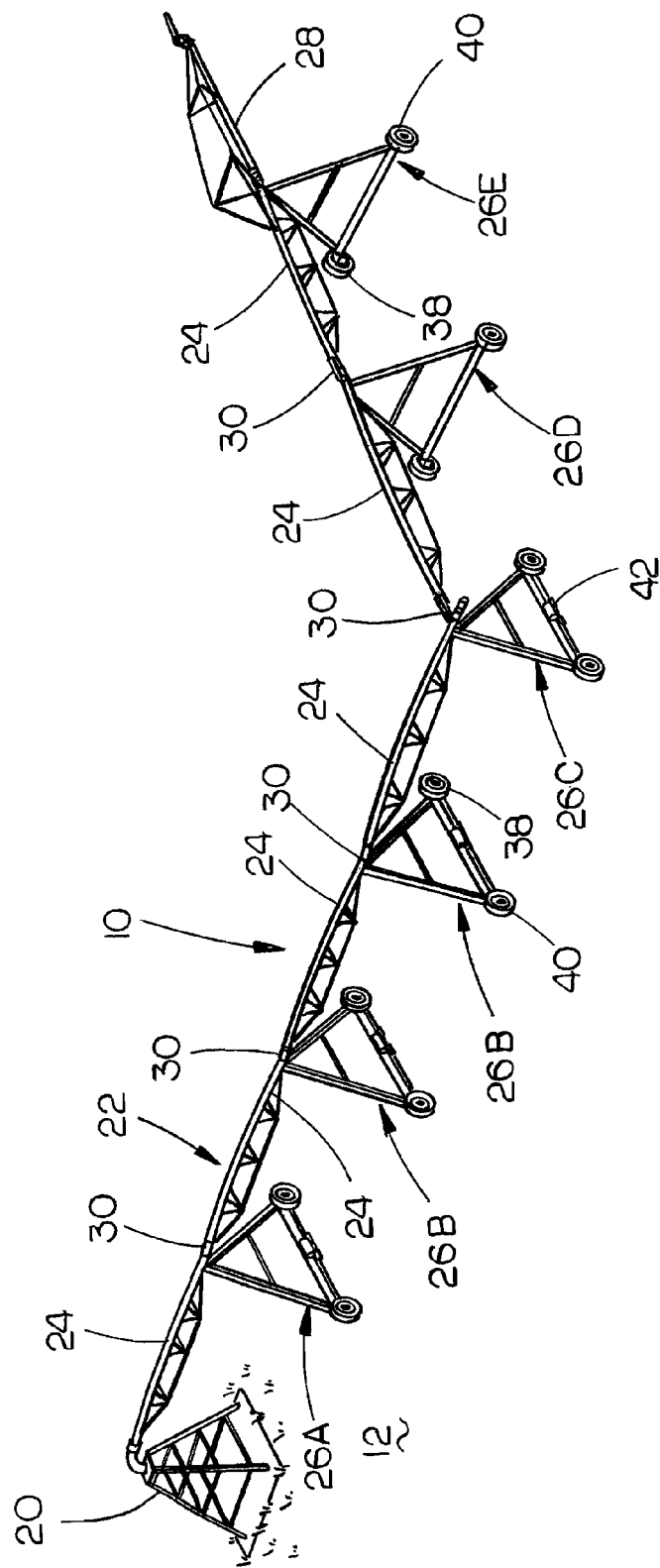
FIG. 1 is a perspective view illustrating the first embodiment of the invention with the last drive unit and the second to last unit thereof being in the trailing position.
Figure 2:
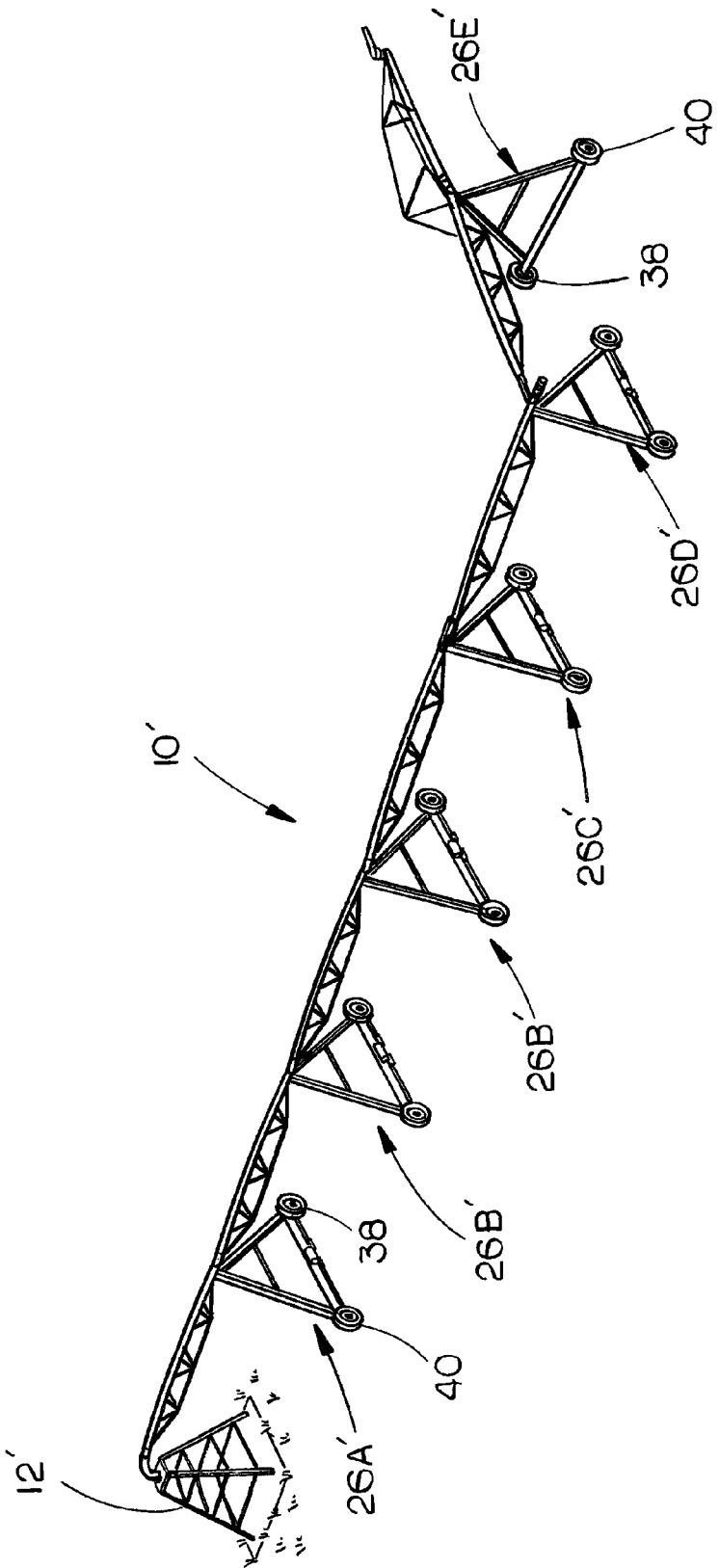
FIG. 2 is a perspective view of the first embodiment of the invention which illustrates the last drive unit in a trailing position.
Figure 3:
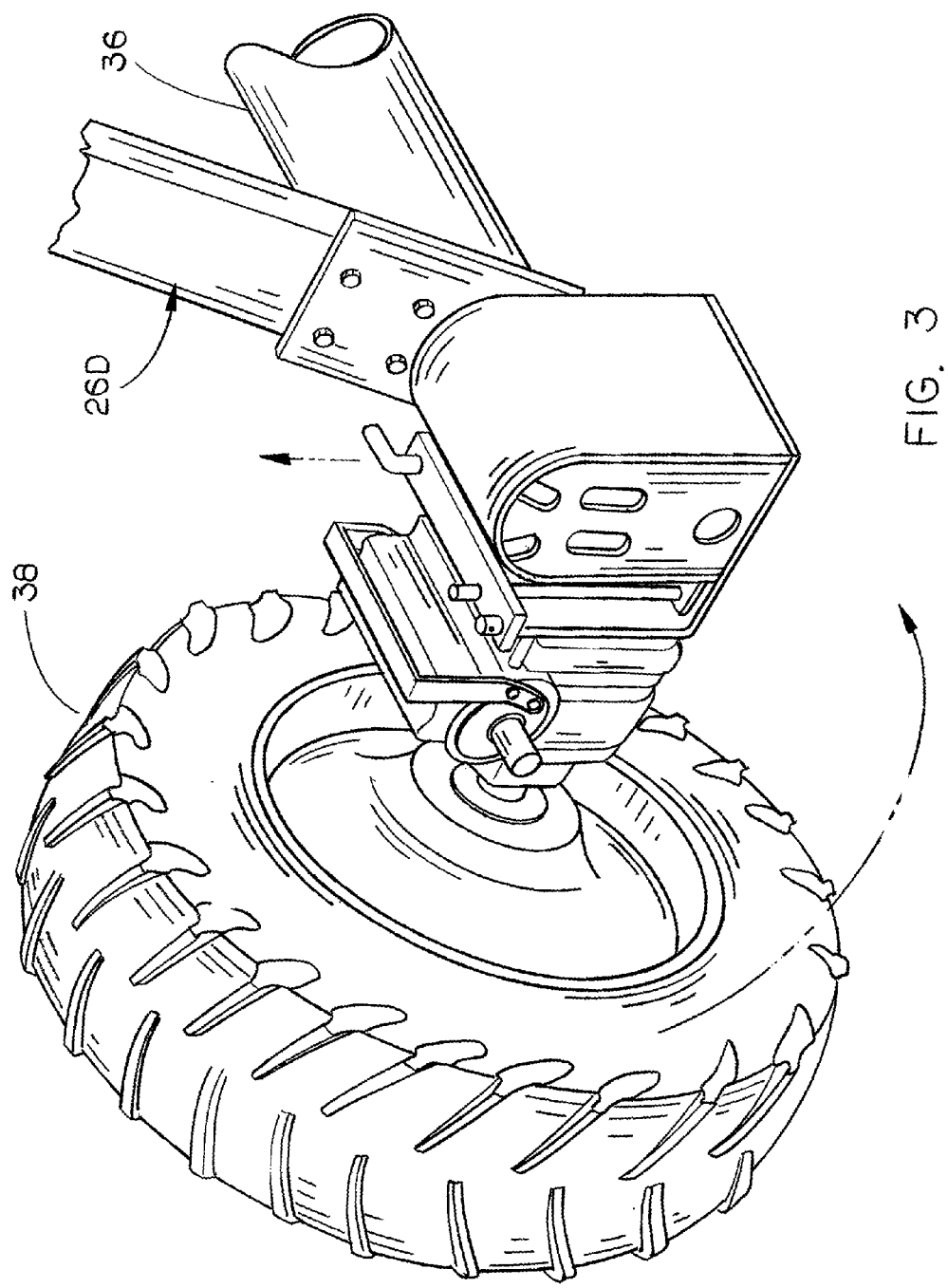
FIG. 3 is a partial perspective view illustrating the manner in which the drive wheels on the next to last drive unit and the last drive unit are pivoted from an irrigating position to a towed position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a first embodiment of the mechanized irrigation system of this invention while the numeral 10' refers to a second embodiment of the mechanized irrigation system of this invention. In the drawings, the mechanized irrigation system 10 and 10' are center pivot irrigation systems. Since system 10' is very similar to the system 10, only system 10 will be described in detail with "'" indicating identical structure on system 10'.

System 10 is designed to irrigate a field or area 12 in an arc-like or circular manner in a conventional fashion. As seen in the drawings, the field 12 has an obstruction 14, having a first side 16 and a second side 18, such as a farmstead, or trees, which prevent the system 10 from traveling in a complete circle. System 10 includes a conventional center pivot structure 20 having a water pipeline 22 pivotally secured thereto. Water pipeline 22 is comprised of a plurality of pipe spans 24 which are supported upon a plurality of spaced-apart drive units in conventional fashion. For purposes of description, the drive units will be described as including an inner drive unit 26A, one or more intermediate drive units 26B, a second to last drive unit 26C, a next to last drive unit 26D and a last drive unit 26E. Drive unit 26E will usually have an extension boom 28 extending outwardly therefrom to effectively increase the length of the water pipeline 22. Adjacent pipe spans 24 have a flexible joint 30 therebetween in conventional fashion. The joints 30 usually include a flexible boot 32 connecting the outer end of one pipe span with the inner end of the adjacent pipe span. Preferably, an electrically operated water valve 33 is imposed in the water pipeline at the second to last drive unit 26E as will be discussed in more detail hereinafter.

All the drive units 26A, 26B, 26C, 26D and 26E include an elongated main beam 36 having a longitudinal axis which is disposed transversely to the longitudinal axis of the water pipeline. A wheel assembly 38 is mounted on one end of main beam 36 and a wheel assembly 40 is mounted on the other beam. The rotational axes of the wheel assemblies 38 and 40 on the drive units 26A, 26B and 26C are disposed parallel to the longitudinal axis of water pipeline 22 in a non-pivotal manner; that is, the wheel assemblies 38 and 40 of drive units 26A, 26B and 26C cannot be moved to a towing position. However, if the entire system 10 is of the towable type, the wheel assemblies 38 and 40 on the drive units 26A, 26B and 26C, will have the capability of being pivotally movable between irrigating and towable position.

Figure 4:
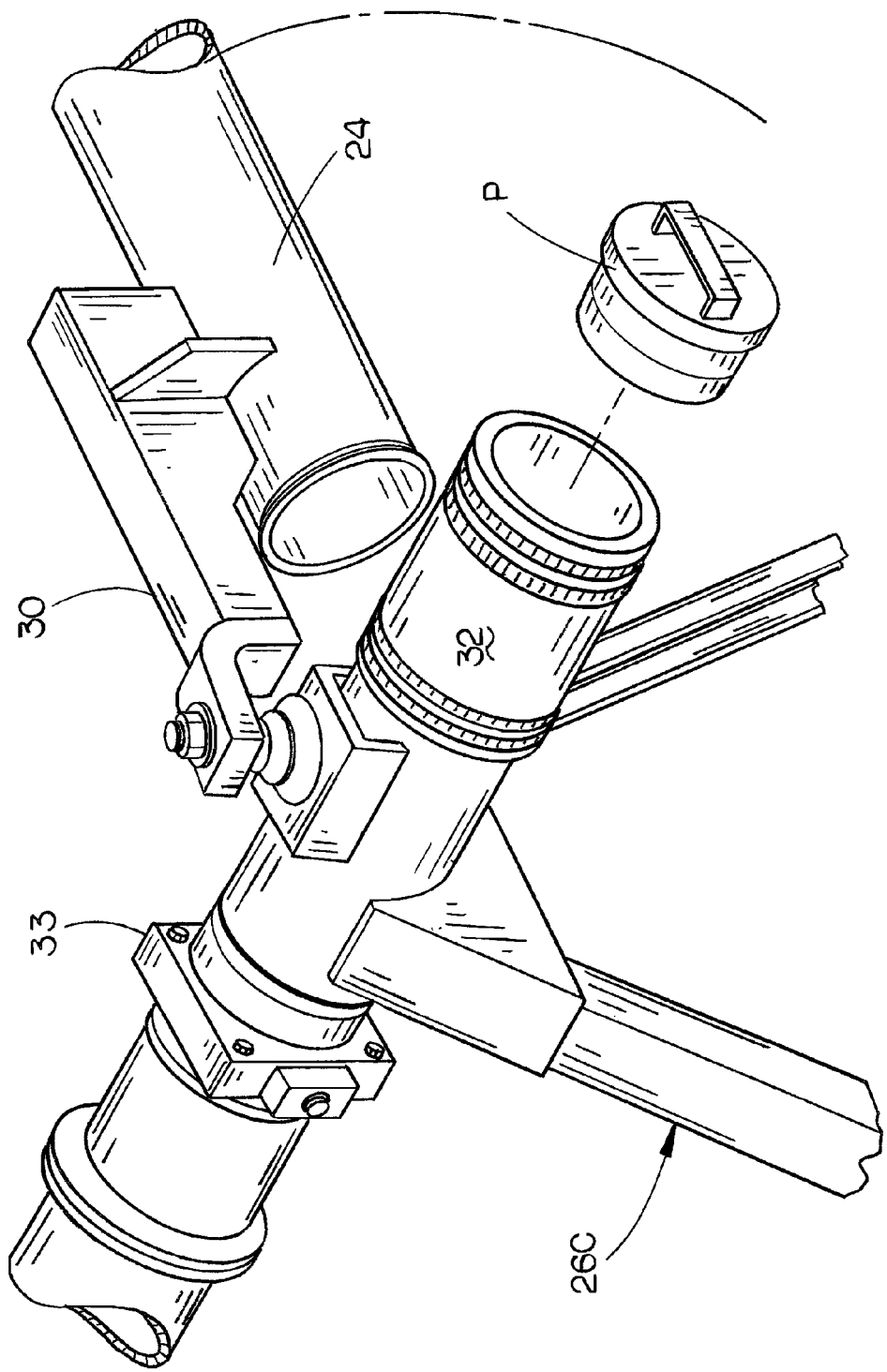
FIG. 4 is a partial perspective view illustrating the manner in which the pipeline is shut down by either a plug or valve when a portion of the irrigation system is in the trailing position.
Figure 5:
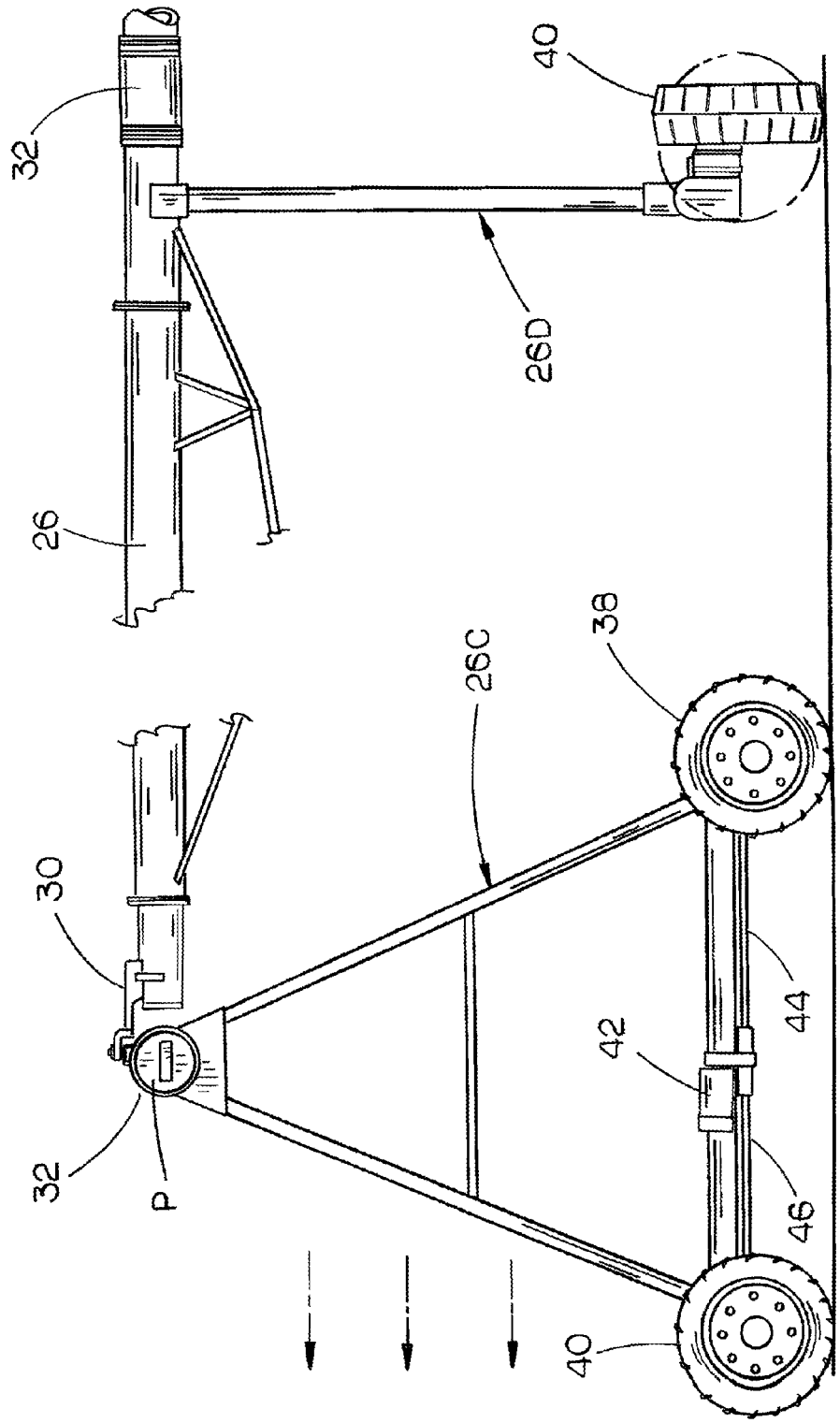
FIG. 5 is a partial end view which illustrates a portion of the center pivot irrigation system in a trailing position.

The wheel assemblies 38 and 40 on drive units 26D and 26E are of the towable type. The rotational axes of wheel assemblies 38 and 40 on drive units 26D and 26E are normally disposed, during irrigational movement of the system 10, parallel to the longitudinal axis of the water pipeline. However, the wheel assemblies 38 and 40 may be selectively pivoted 90 degrees so that the rotational axes of wheel assemblies 38 and 40 on drive units 26D and 26E are transversely disposed with respect to the longitudinal axis of the water pipeline (FIG. 4). The towable wheel assemblies 38 and 40 of drive units 26D and 26E are conventional in design and are readily available. The towable wheel assemblies could be of the steerable type or guided type.

A reversible drive motor (power unit) 42 is mounted on each of the main beams 36 of all of the drive units. Drive motor 42 may be an electric motor, a hydraulic motor, a water driven motor or a pressurized air motor. Drive motor 42 is operatively connected to the wheel assemblies 38 and 40 by drive shafts 44 and 46 respectively. In some systems, a power unit is connected to each of the wheel assemblies 38 and 40. In that case, the drive shafts 44 and 46 will be omitted.

The operation of center pivot irrigation system 10 will now be described. With respect to FIG. 6A, the center pivot system 10 has moved forwardly in a clockwise direction in a substantially aligned manner to irrigate the area over which the system has moved. The system 10 is moved forwardly until the outer end of the system is adjacent to the first side 16 of obstruction 14 (FIG. 6A) at which time the entire system is shut down due to the engagement of the last drive unit 26E with a conventional barricade which when engaged by the last drive unit 26E, will shut down all the drive motors on the drive units and the irrigation sprinklers in conventional fashion.

The operator then disconnects the alignment system on the second to last drive unit 26C. The alignment system could be disabled and enabled manually, electrically or automatically. If the water valve 33 is provided in the water pipeline at the second to last drive unit 26C, valve 33 is closed to prevent water from being supplied to the pipe spans outwardly of the drive unit 26C. If the water valve 33 is not provided at drive unit 26C, the outer end of the boot 32 may be disconnected from the water pipeline and the open end of the boot 32 is plugged with plug P to prevent water from passing therefrom.

Figure 6A:
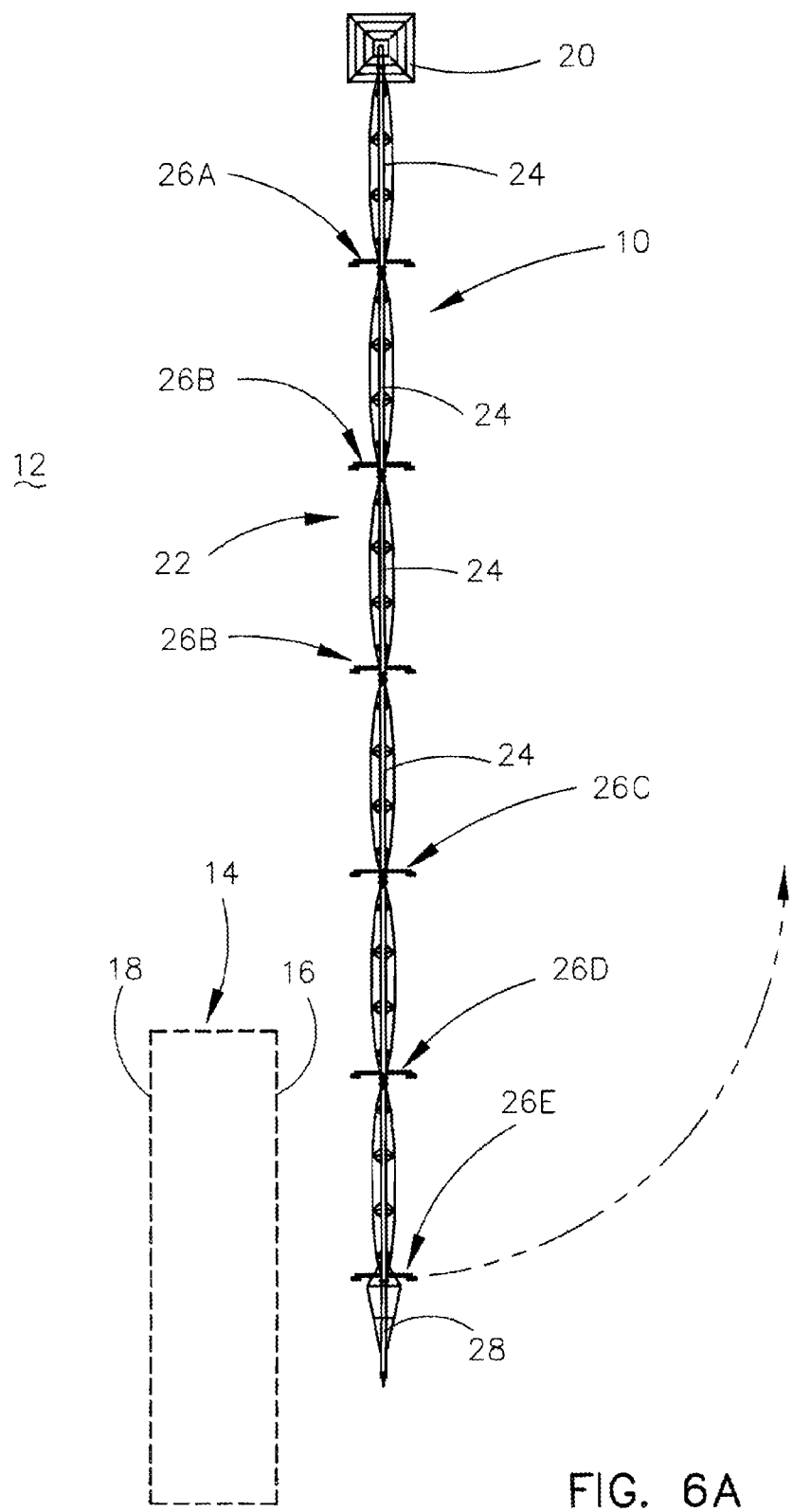
FIGS. 6A-F are sequential drawings which illustrate the manner in which the first embodiment of the system swings around an obstruction.
Figure 6B:
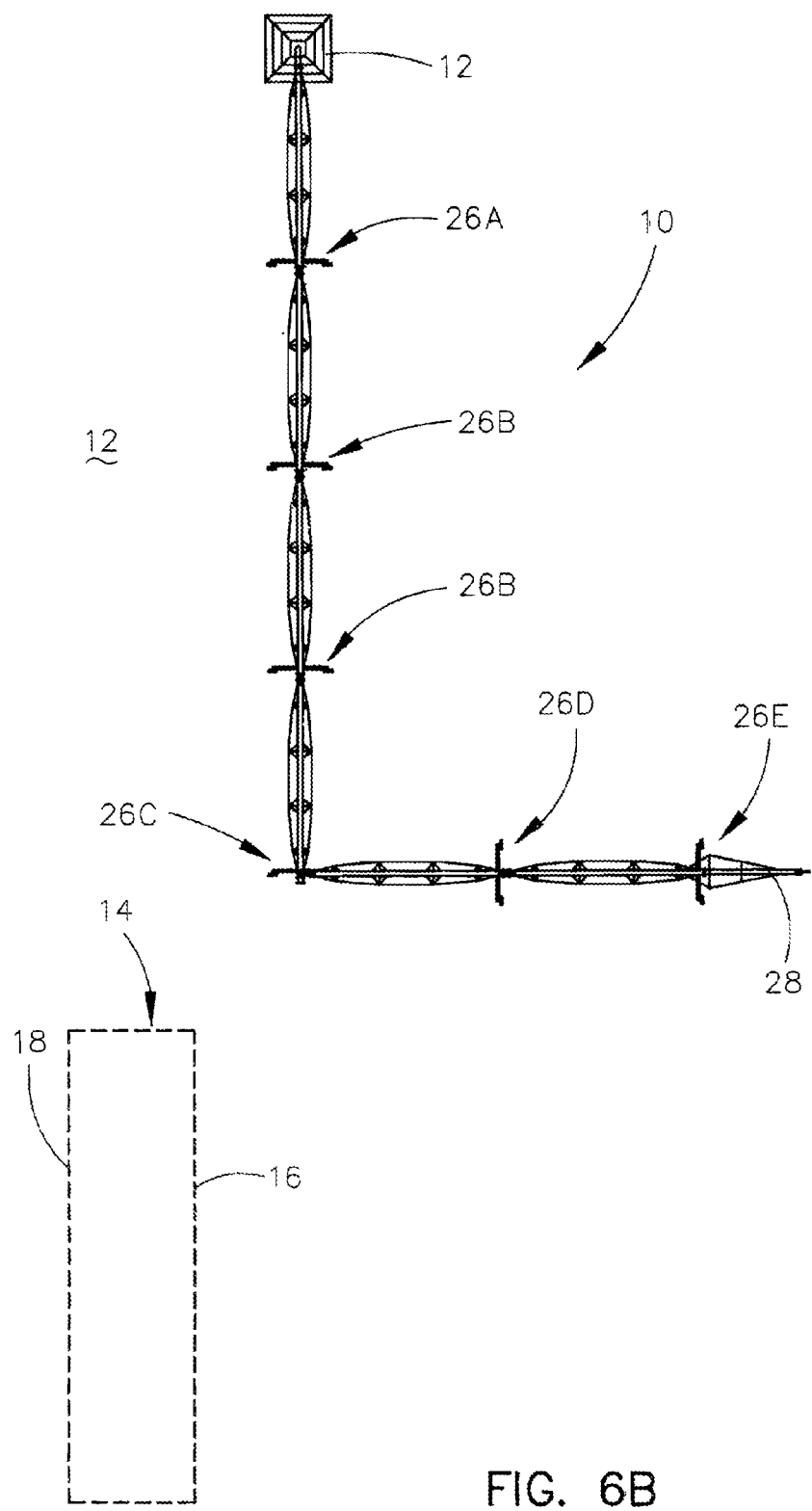
Figure 6C:
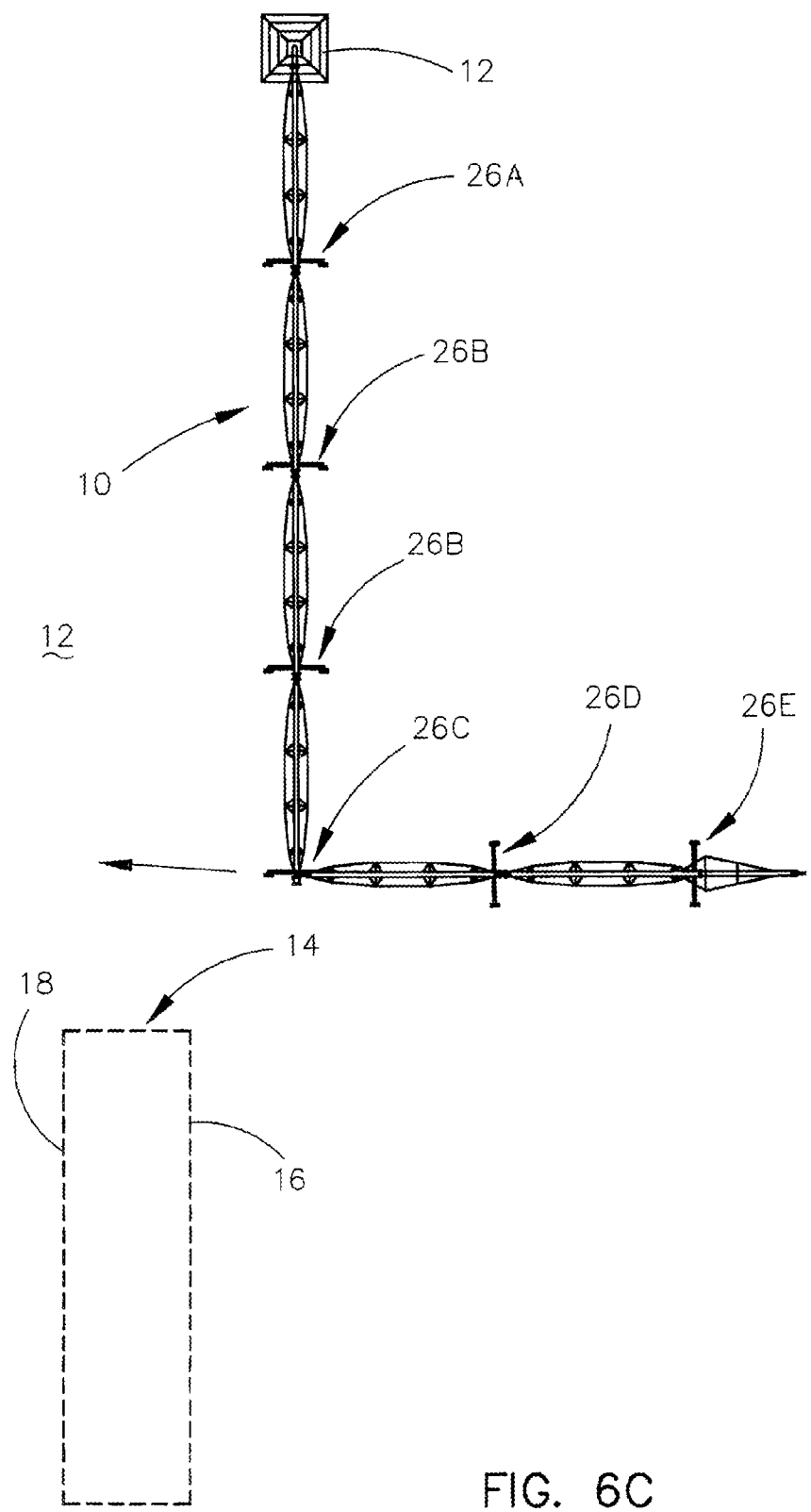
Figure 6D:
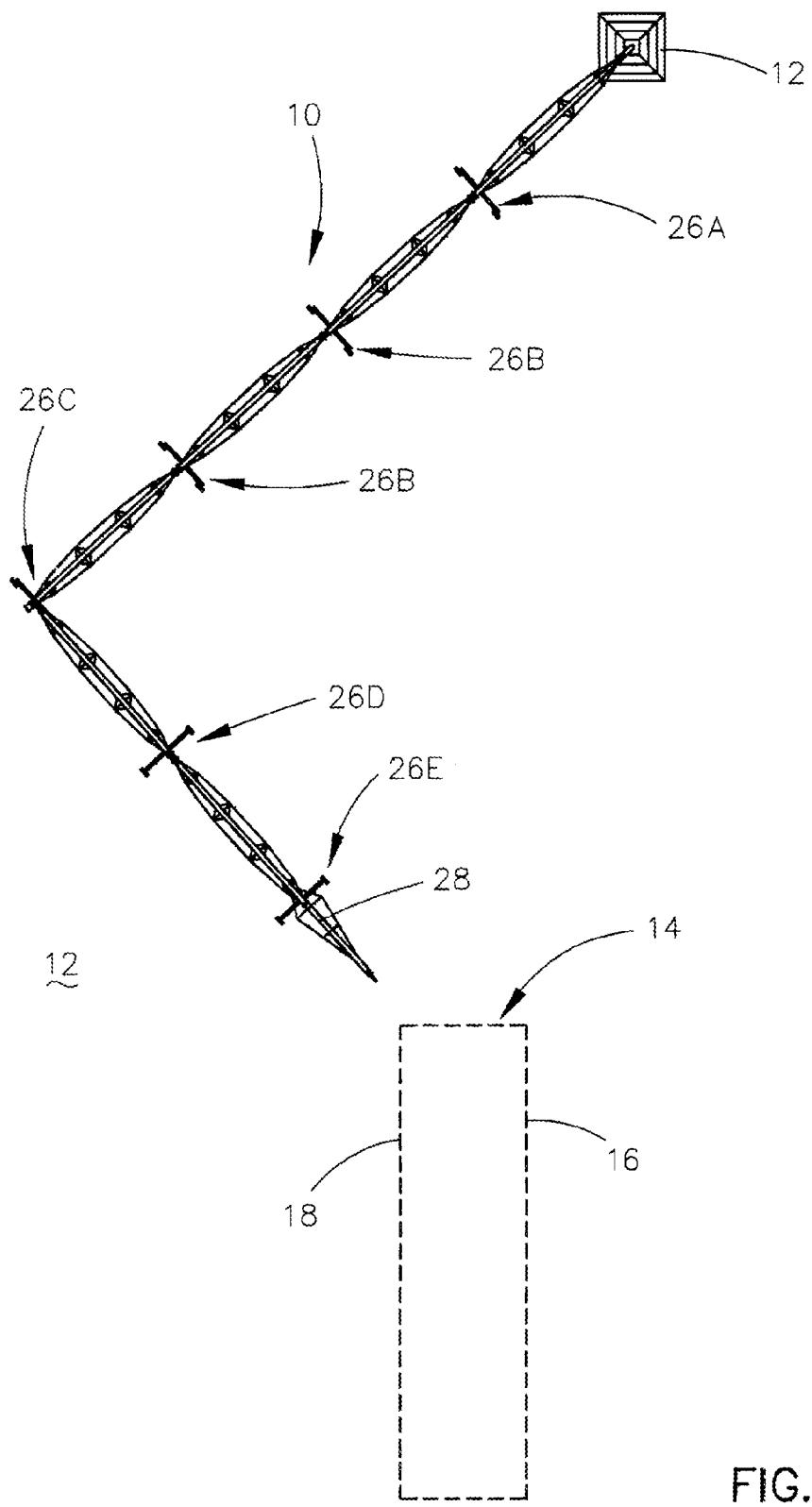

The drive motors 42 on the last drive unit 26E and the next to last drive unit are then operated in a reverse manner which causes the last drive unit 26E and the next to last drive unit 26D and the pipe spans supported thereon to move in a counterclockwise direction as indicated by broken lines in FIG. 6A with respect to the stationary pipe spans and drive units 26A, 26B and 26C until the pipe spans supported by drive units 26D and 26E are at approximately a 90 degree angle with respect thereto (FIG. 6B). The drive shafts 44 and 46 are then disconnected from the wheel assemblies 38 and 40 respectively on each of the drive units 26D and 26E either manually, electrically or automatically. The wheel assemblies are then pivotally moved 90 degrees from their normal irrigating position wherein the rotational axes thereof are parallel to the longitudinal axis of the water pipeline to the towing position wherein the rotational axes of the wheel assemblies 38 and 40 are transversely disposed with respect to the longitudinal axis of the water pipeline. The drive units 26A, 26B and 26C are then actuated, as well as the irrigation sprinklers on the pipe spans support thereon, to pivotally move the system 10 in a clockwise direction (FIG. 6C) to the position of Fig. D when the system 10 is being moved to the position of FIG. 6D, the drive units 26D and 26E are pulled by the drive unit 26C, with the assistance of the drive units 26A and 26B. When the system 10 has sufficiently cleared the obstruction 14 (FIG. 6E), the drive motors on drive units 26A, 26B and 26C are shut off as are the sprinklers on the water pipeline. During the movement of the system 10 from the position of FIG. 6C to FIG. 6D, the area beneath the spans supported by drive units 26A, 26B and 26C will be irrigated.

Figure 6E:
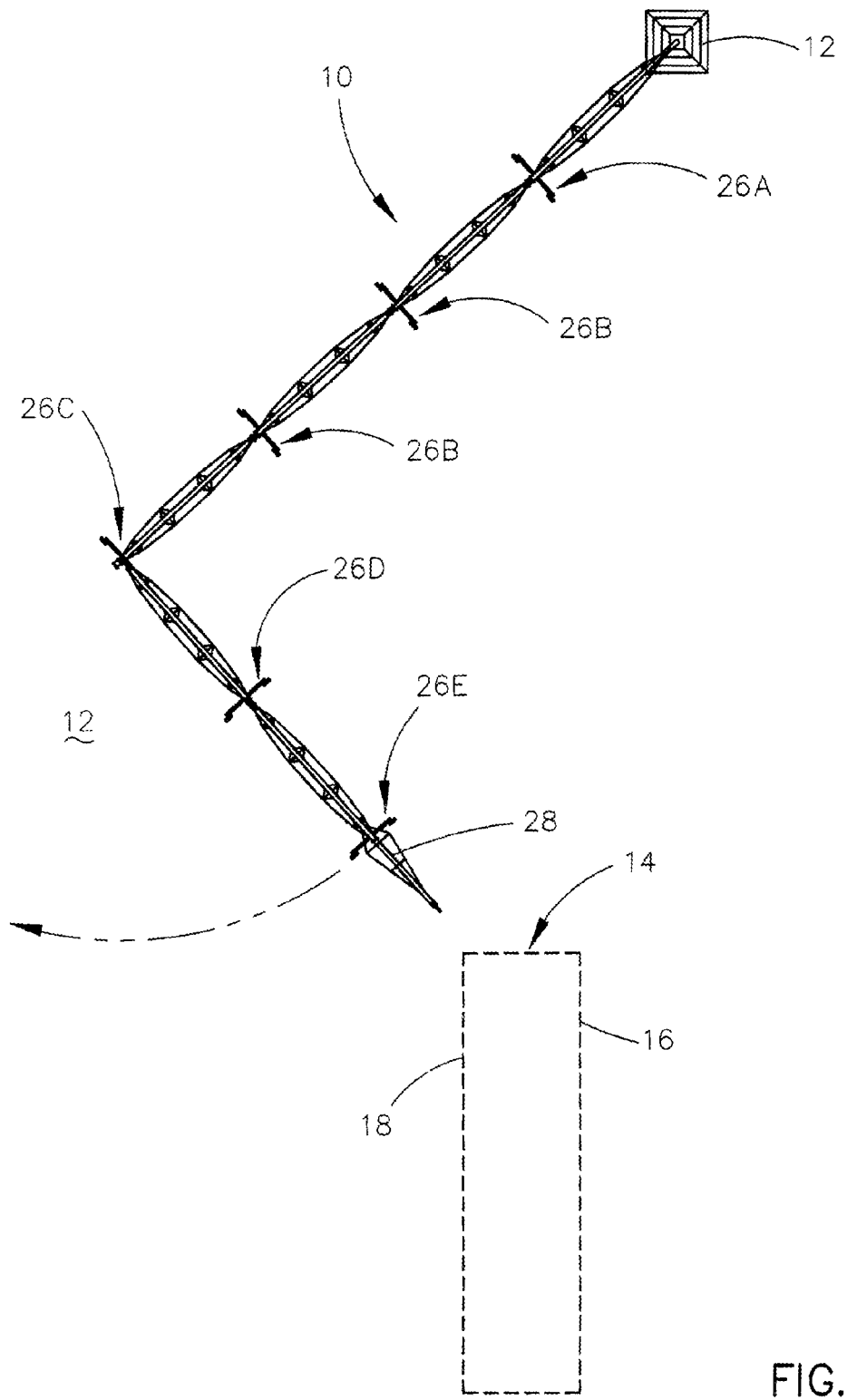
Figure 6F:
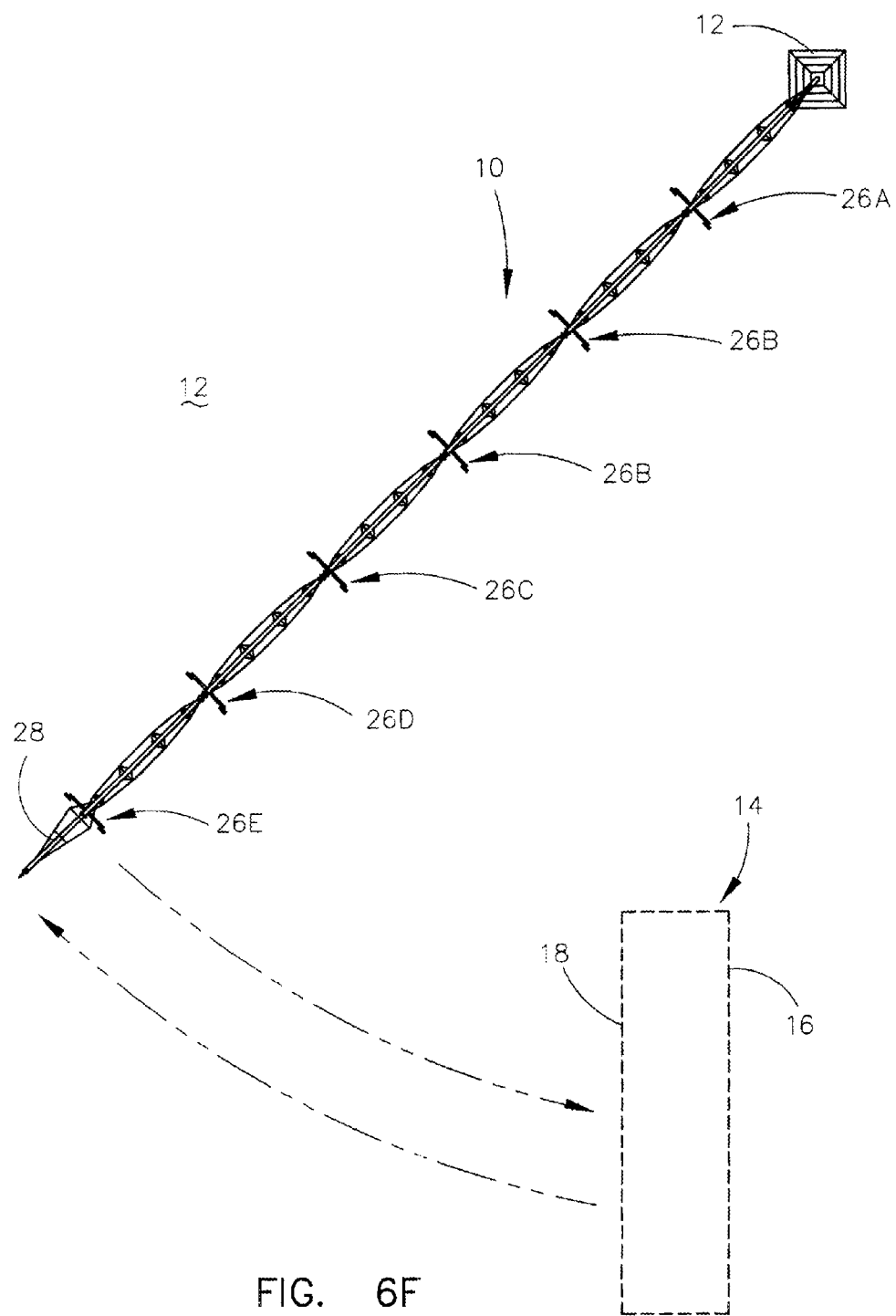

Once the system 10 has been moved to the position of FIG. 6E, and the drive motors on drive units 26A, 26B and 26C have been shut down and the irrigation sprinklers have been shut off, the first and second wheel assemblies on drive units 26D and 26E will be pivoted 90 degrees, either manually, electrically or automatically from their towed or trailing position to the first position wherein the rotational axes of the first and second wheeled assemblies on drive units 26D and 26E are transversely disposed with respect to their associated main beams. The drive shafts 44 and 46 are then connected, either manually, electrically or automatically to the wheel assemblies 38 and 40 respectively on each of the drive units 26D and 26E. The drive motors on drive units 26E and 26D are then operated to pivotally move the drive units 26E and 26D in a clockwise direction until the pipe spans supported by drive units 26D and 26E are parallel to the water pipeline (FIG. 6F). Then drive motors on drive units 26D and 26E are stopped.

The alignment system on the drive unit 26C is then connected. If a water valve was previously closed, that water valve is again opened. If a boot 32 is used, the boot 32 is reconnected to the adjacent pipe spans.

The entire system 10 is then reversed to move the system rearwardly (counterclockwise) to a position adjacent the second side of the obstruction 14 (FIG. 6F). The entire system 10 is then actuated to move the system forwardly in a clockwise direction to irrigate the area thereunder as indicated by the lowermost broken lines in FIG. 6F.

With respect to system 10', the primary difference between system 10' and system 10 is that only drive unit 26E' and the pipe span 24 supported thereon are pivotally moved from an aligned irrigating position to the trailing, tucked or towed position of FIG. 1. The operation of system 10' will now be described.

Figure 7A:
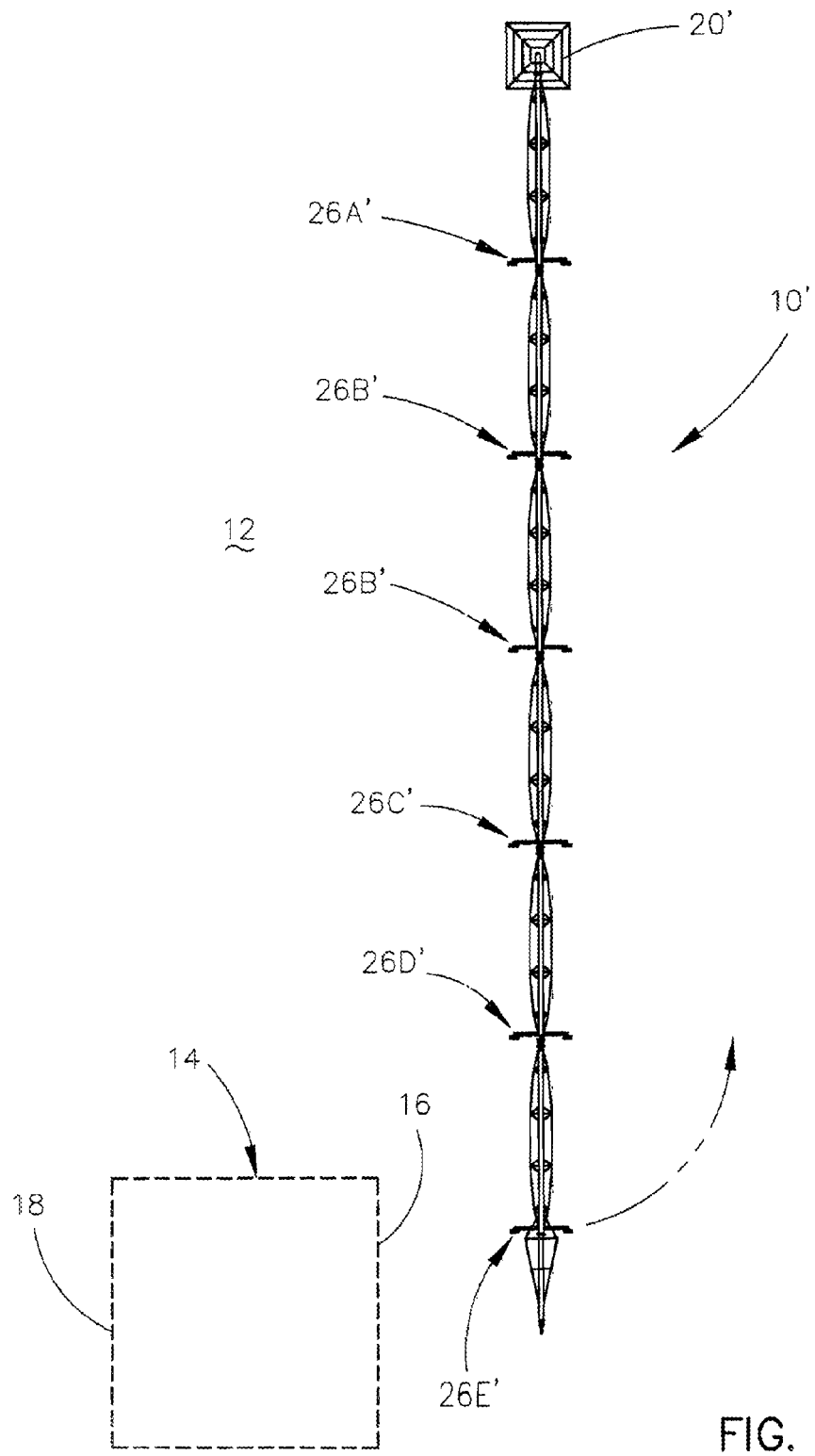
FIGS. 7A-F are sequential drawings which illustrate the second embodiment of the system swinging around an obstruction.

With respect to FIG. 7A, the center pivot irrigation system 10' has moved forwardly in a clockwise direction in a substantially aligned manner to irrigate the area over which the system has moved. The system 10' is moved forwardly in a clockwise manner until the outer end of the system is adjacent to the first side of obstruction 14 (FIG. 7A) at which time the entire system is shut down due to the engagement of the last drive unit 26E' with a conventional barricade which when engaged by the last drive unit 26E', causes all the drive motors on the drive units and the irrigation sprinklers to be shut down in conventional fashion.

Figure 7B:
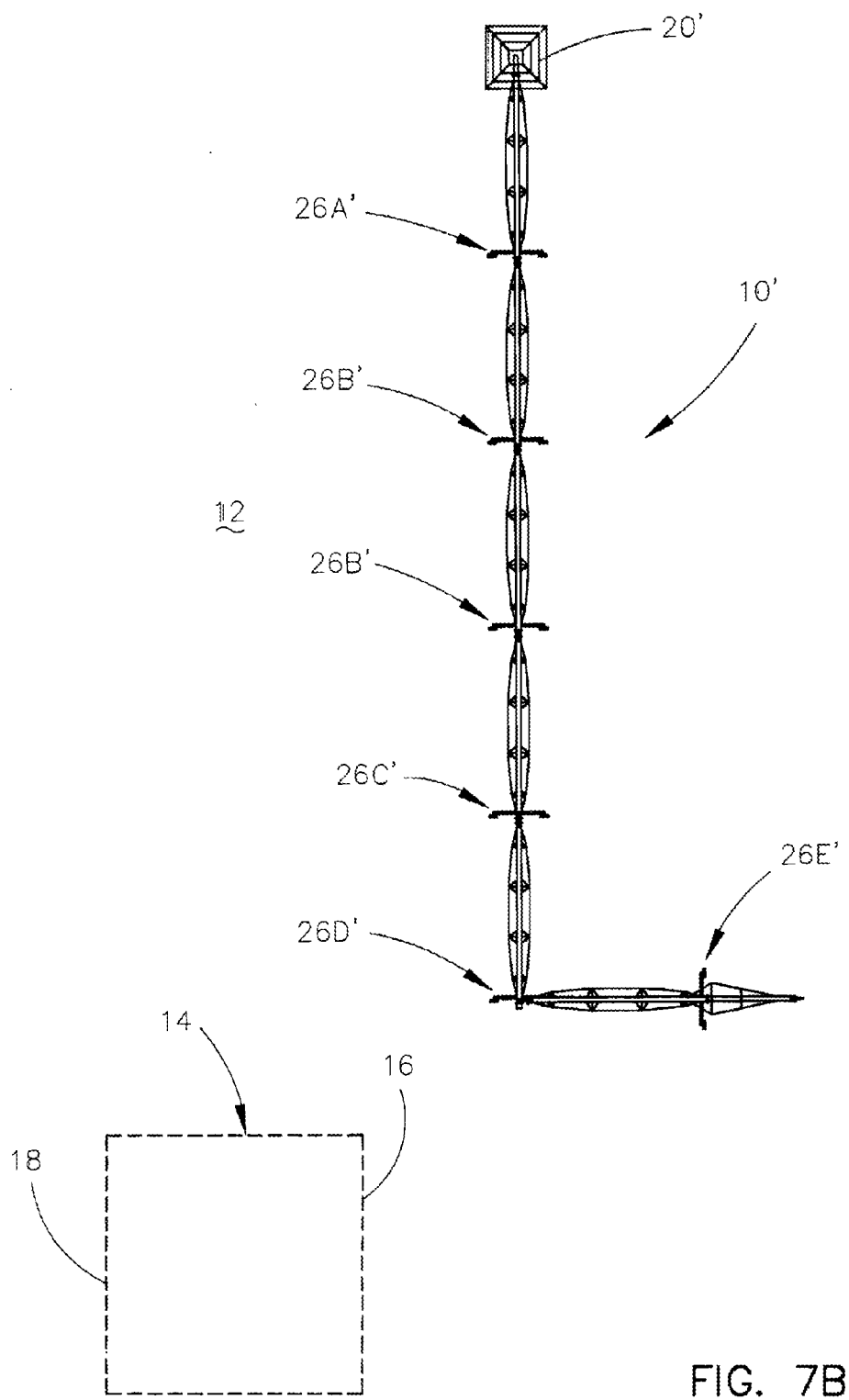

The alignment system on the next to last drive unit 26D is then disconnected or disabled manually, electrically or automatically. If a water valve is provided in the water pipeline at the next to last drive unit 26D, that valve is closed to prevent water from being supplied to the pipe span 24 supported by drive unit 26E. If a water valve is not provided at drive unit 26D, the outer end of the boot 32 may be disconnected from the water pipeline and the open end of the boot 32 is plugged with plug P to prevent water from passing therefrom. The drive motor on the last drive unit 26E is then operated in a reverse manner which causes the last drive unit 26E and the pipe span supported thereon to move in a counterclockwise direction as indicated by broken lines in FIG. 7A with respect to the stationary pipe spans and drive units 26A, 26B, 26C and 26D until the pipe span supported by drive unit 26E is at approximately a 90 degree angle with respect thereto (FIG. 7B).

The drive shafts 44 and 46 are then disconnected from the wheel assemblies 38 and 40 on the last drive unit 26E. The wheel assemblies 38 and 40 on drive unit 26E are then pivotally moved 90 degrees from their normal irrigating position wherein the rotational axes thereof are parallel to the longitudinal axis of the water pipeline to the towing position wherein the rotational axes of the wheel assemblies 38 and 40 on drive unit 26E are transversely disposed with respect to the longitudinal axis of the water pipeline.

Figure 7C:
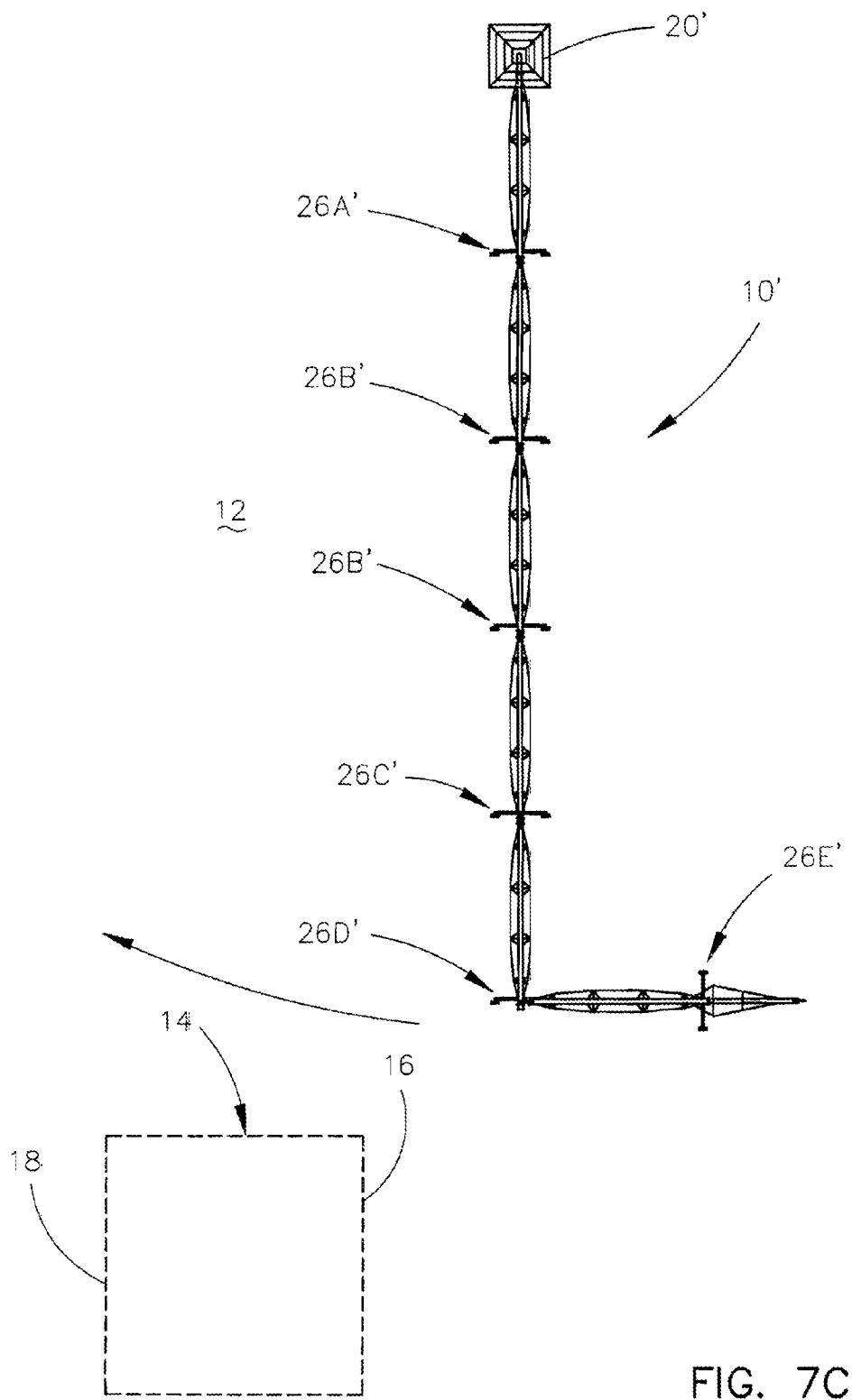
Figure 7D:
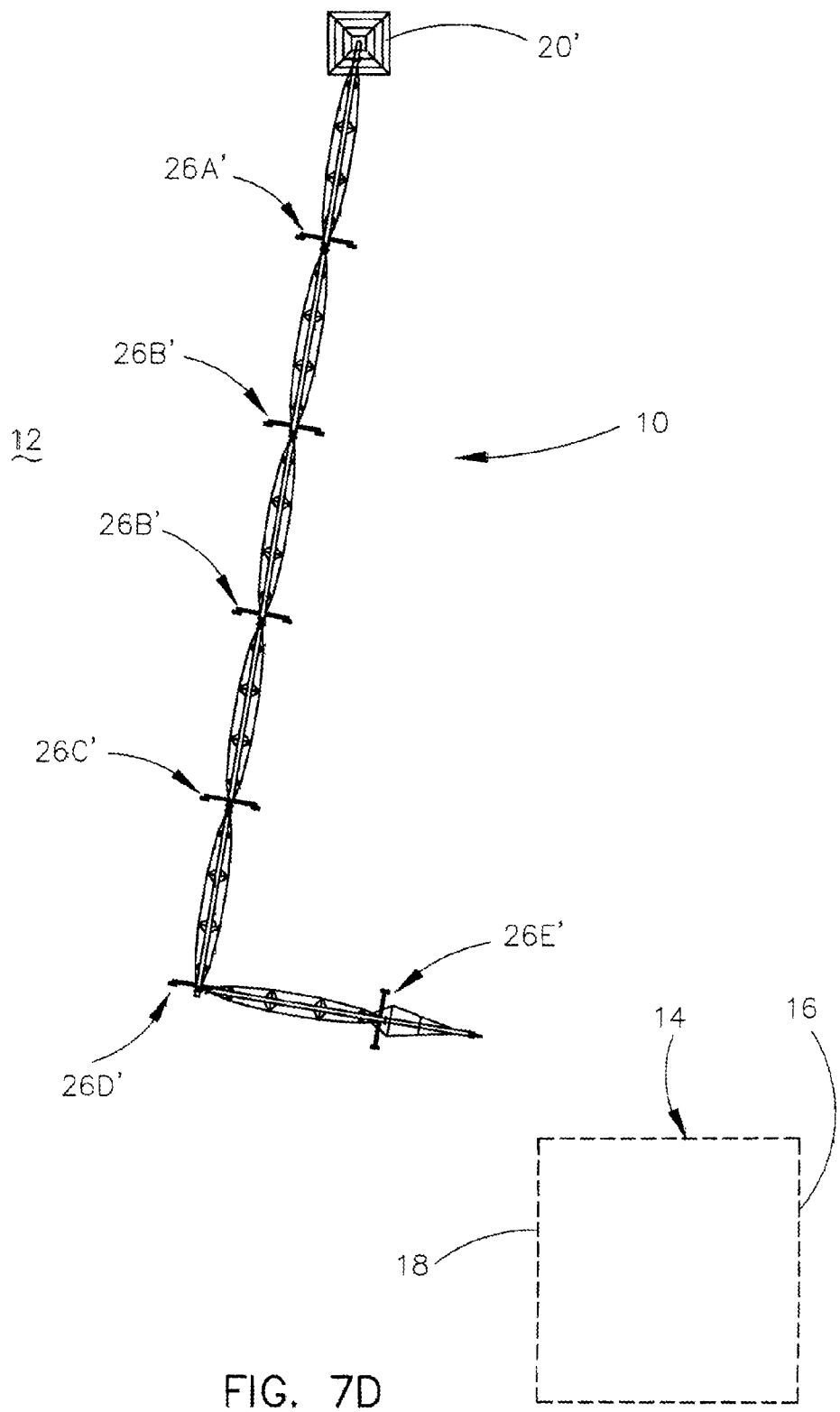

The drive units 26A, 26B, 26C and 26D are then actuated, as well as the irrigation sprinklers of the pipe span supported thereon, to pivotally move the system 10' in a clockwise direction (FIG. 7C). When the system 10' is being moved to the position of FIG. 7D, the drive unit 26E is pulled by the drive unit 26D, with the assistance of the drive units 26A, 26B and 26C. When the system 10' has sufficiently cleared the obstruction 14, (FIG. 7E), the drive motors on drive units 26A, 26B, 26C and 26D are shut off as are the sprinklers on the water pipeline. During the movement of the system 10' from the position of FIG. 7C to FIG. 7D, the area beneath the span supported by the drive units 26A, 26B, 26C and 26D will be irrigated.

Figure 7E:
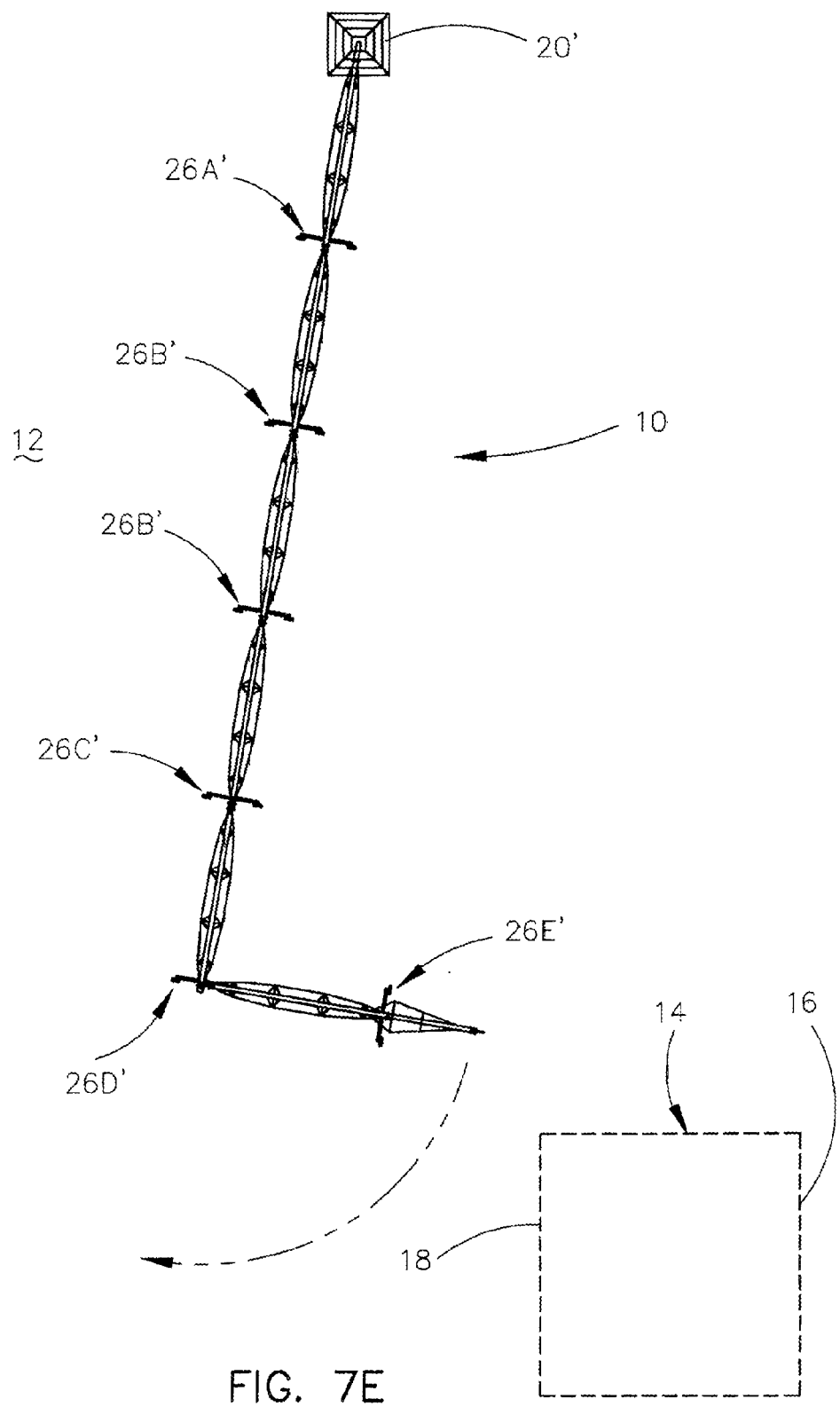
Figure 7F:
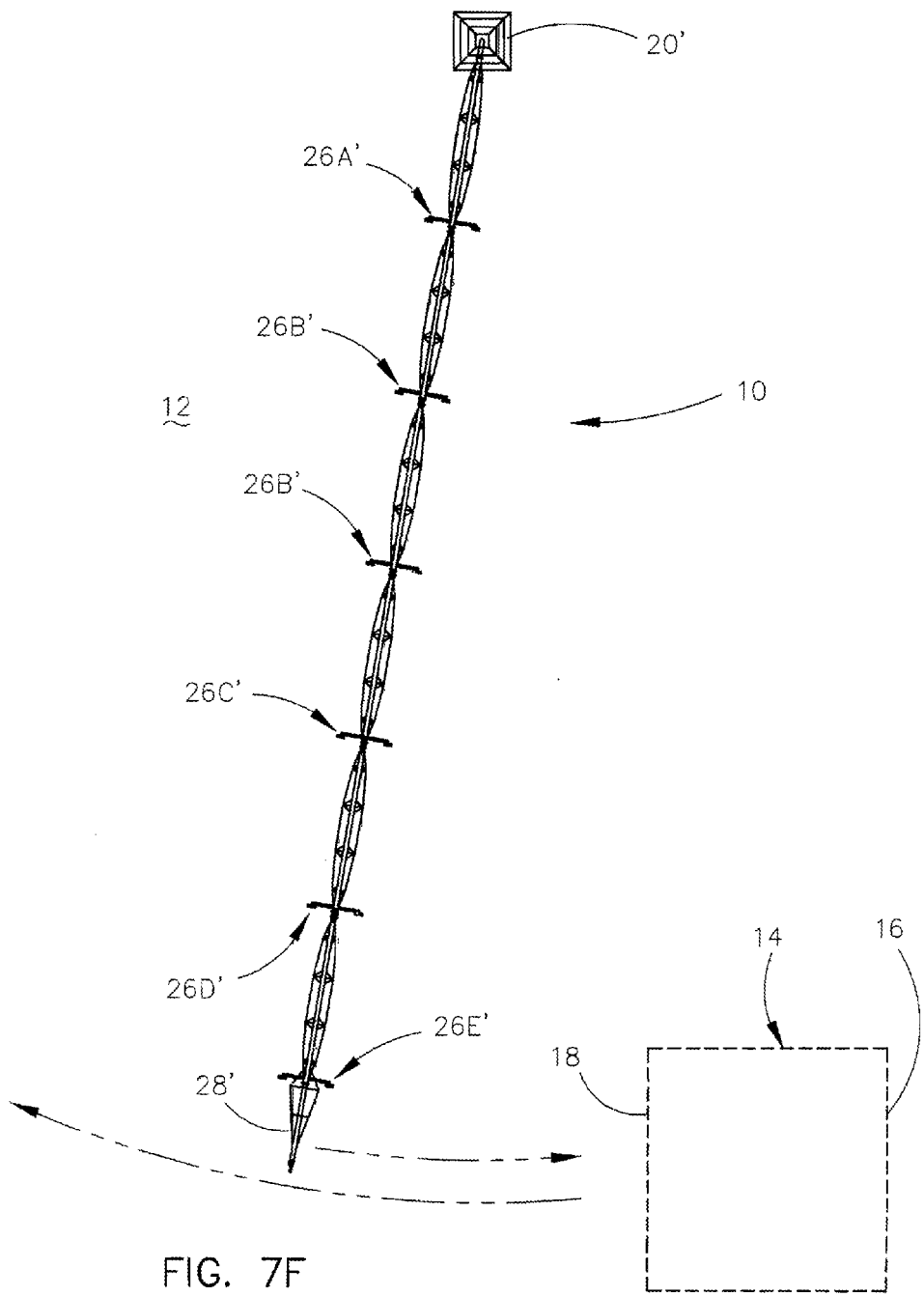

Once the system 10' has been moved to the position of FIG. 7E, and the drive motors on drive units 26A, 26B, 26C and 26D have been shut down and the irrigation sprinklers have been shut off, the first and second wheel assemblies on drive unit 26E will be pivoted 90 degrees from their normal towed or trailing position to the first or irrigating position wherein the rotational axes of the first and second wheel assemblies 38 and 40 on drive unit 26E are transversely disposed with respect to the beam of 26E. The drive shafts 44 and 46 of drive unit 26E are then connected to the wheel assemblies 38 and 40 on drive unit 26E. The drive motor on drive unit 26E is then operated to pivotally move the drive unit 26E in a clockwise direction until the pipe span supported by drive unit 26E is parallel to the pipeline (FIG. 7F). Then the drive motor on drive unit 26E is stopped.

The alignment system on drive unit 26D is then enabled or connected either manually, electrically or automatically. If water valve 33 was previously closed, the water valve 33 is again opened. If a boot 32 is used, the boot 32 is reconnected to the adjacent pipe span. In some cases, if the boot 32 is sufficiently flexible, there will be no need to disconnect the boot as long as the valve 33 is utilized.

The entire system 10' is then reversed to move the system rearwardly (counterclockwise) to a position adjacent the second side of the obstruction 14 (FIG. 7F). The entire system 10' is then actuated to move the system forwardly in a clockwise direction to irrigate the area thereunder as indicated by the lowermost broken lines in FIG. 7F.

Although system 10 involves the ability of the pipe spans supported by drive units 26D and 26E to be pivotally moved to the trailing position and system 10' involves the ability of the pipe span supported by drive unit 26E to be pivotally moved to the trailing position, the intermediate drive units, if obstructed, may be pivotally moved to avoid or by-pass an obstruction. A mechanized irrigation system of the lateral move type may also be manipulated to avoid or by-pass an obstruction in the area to be irrigated.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. The method of irrigating an area with a reversible mechanized irrigation system, having first and second ends, wherein an obstruction, having first and second sides, is in the path of the first end of the mechanized irrigation system with the mechanized irrigation system including: a plurality of pipe spans joined together to form an elongated water pipeline; each of the pipe spans being supported upon an associated drive unit to propel the water pipeline over the area to be irrigated; each of the pipe spans having water sprinklers thereon; each of the drive units including an elongated main beam, having first and second ends, which is disposed transversely with respect to the longitudinal axis of the water pipeline; a first drive wheel operatively rotatably secured to the first end of the main beam about a generally horizontal axis which is transversely disposed with respect to the longitudinal axis of the main beam; a second drive wheel operatively secured to the second end of the main beam about a generally horizontal axis which is transversely disposed with respect to the longitudinal axis of the main beam; a reversible power unit operatively secured to the first and second drive wheels for selectively driving the first and second drive wheels in a forward direction and a reverse direction; a flexible joint assembly between adjacent pipe spans; an alignment system interconnecting adjacent pipe spans; the drive units at the first end of the water pipeline being configured to permit each of the first and second drive wheels thereon to be selectively pivotally movable between a first position wherein the rotatable horizontal axis between the wheel and the main beam is transverse to the longitudinal axis of the main beam to a second position wherein the rotatable horizontal axis between the wheel and the main beam is parallel to the longitudinal axis of the main beam; comprising the steps of:

operating all the drive units to propel the water pipeline over the area to be irrigated with the water pipeline being in a generally aligned position to irrigate the area therebelow until the first end of the water pipeline is positioned near the first side of the obstruction;

stopping all the power units on the drive units and the irrigation of the area;

closing the water pipeline at the innermost drive unit at the first end of the water pipeline which avoids the obstruction;

operating the power units on the drive units, which are obstructed by the obstruction, in a reverse manner so that portion of the water pipeline which is supported by the obstructed drive units is disposed approximately at a right angle with respect to that portion of the water pipeline which is supported by the unobstructed drive units;

pivoting the first and second drive wheels on the obstructed drive units from the first position to the second position;

operating, while irrigating from that portion of the water pipeline which is supported by the unobstructed drive units, all the power units on all the unobstructed drive units in a forward direction until the water pipeline and the obstructed drive units are positioned sufficiently past the second side of the obstruction;

stopping the irrigation from that portion of the water pipeline which is supported by the obstructed drive units;

stopping the power units on the obstructed drive units which were previously actuated;

pivoting the first and second drive wheels on the obstructed drive units from the second position to the first position;

operating the power units of the obstructed drive units in a forward direction until that portion of the water pipeline supported on the obstructed drive units is parallel to the water pipeline and supported by the unobstructed drive units;

opening the water pipeline on the innermost drive at the first end of the water pipeline which avoids the obstruction;

operating the reversible power units on all the drive units in a reverse manner until the first end of the water pipeline is positioned near the second side of the obstruction;

and operating all the power units of the drive units in a forwardly direction to apply irrigating water to the area.

2. The method of claim 1 wherein the power units are electrically driven.

3. The method of claim 1 wherein the power units are hydraulically driven.

4. The method of claim 1 wherein the power units are water driven.

5. The method of claim 1 wherein the power units are air driven.

6. The method of claim 1 wherein the mechanized irrigation system is a center pivot irrigation system.

7. The method of claim 1 wherein the mechanized irrigation system is a lateral move irrigation system.

* * * * *